United States Patent
Agarwal et al.

(10) Patent No.: US 12,242,751 B2
(45) Date of Patent: Mar. 4, 2025

(54) DATA STORAGE DEVICE AND METHOD FOR HOST-ASSISTED EFFICIENT HANDLING OF MULTIPLE VERSIONS OF DATA

(71) Applicant: Western Digital Technologies, Inc., San Jose, CA (US)

(72) Inventors: Dinesh Kumar Agarwal, Bangalore (IN); Amit Sharma, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/223,133

(22) Filed: Jul. 18, 2023

(65) Prior Publication Data

US 2024/0295981 A1 Sep. 5, 2024

Related U.S. Application Data

(60) Provisional application No. 63/449,835, filed on Mar. 3, 2023.

(51) Int. Cl.
*G06F 3/06* (2006.01)
(52) U.S. Cl.
CPC .......... *G06F 3/0652* (2013.01); *G06F 3/0619* (2013.01); *G06F 3/0647* (2013.01); *G06F 3/0683* (2013.01)
(58) Field of Classification Search
CPC .... G06F 3/0652; G06F 3/0619; G06F 3/0647; G06F 3/0683
See application file for complete search history.

(56) References Cited

U.S. PATENT DOCUMENTS

| | | | |
|---|---|---|---|
| 6,321,238 B1 * | 11/2001 | Putzolu | G06F 16/27 |
| 6,341,340 B1 * | 1/2002 | Tsukerman | G06F 16/27 |
| | | | 707/E17.007 |
| 7,587,564 B2 | 9/2009 | Lorenz et al. | |
| 7,610,437 B2 * | 10/2009 | Sinclair | G06F 3/0652 |
| | | | 711/104 |
| 7,984,084 B2 * | 7/2011 | Sinclair | G06F 16/1847 |
| | | | 707/818 |
| 8,078,570 B2 | 12/2011 | Chen et al. | |
| 8,285,918 B2 * | 10/2012 | Maheshwari | G11C 7/1072 |
| | | | 711/159 |

(Continued)

OTHER PUBLICATIONS

Robert Sheldon, "overprovisioning (SSD overprovisioning)", Feb. 20, 2023, pp. 1-6, https://web.archive.org/web/20230220223635/ https://www.techtarget.com/searchstorage/definition/overprovisioning-SSD-overprovisioning (Year: 2023).*

(Continued)

*Primary Examiner* — Christopher D Birkhimer
(74) *Attorney, Agent, or Firm* — Crowell & Moring LLP

(57) ABSTRACT

A data storage device and method for host-assisted efficient handling of multiple versions of data are provided. In one embodiment, a data storage device is provided comprising a memory and a controller. The controller is configured to receive, from a host, identification of different versions of data that are to deleted together, store the different versions of the data in areas of the memory that are erasable in parallel; receive, from the host, a command to erase the different versions of the data; and erase the different versions of the data in parallel. Other embodiments are provided.

19 Claims, 10 Drawing Sheets

(56) References Cited

U.S. PATENT DOCUMENTS

| | | | |
|---|---|---|---|
| 8,429,359 B1* | 4/2013 | Desai | G06F 11/1461 |
| | | | 711/E12.103 |
| 8,443,263 B2* | 5/2013 | Selinger | G06F 11/1068 |
| | | | 714/768 |
| 8,538,919 B1* | 9/2013 | Nielsen | H04L 63/0272 |
| | | | 718/1 |
| 8,593,678 B2* | 11/2013 | Ohishi | H04N 1/2166 |
| | | | 358/1.15 |
| 8,873,284 B2* | 10/2014 | Sinclair | G06F 12/0246 |
| | | | 365/185.11 |
| 8,874,515 B2 | 10/2014 | Bodwin et al. | |
| 9,075,705 B2* | 7/2015 | Hikichi | G06F 11/004 |
| 9,092,182 B2* | 7/2015 | Ohishi | H04N 1/00944 |
| 9,183,236 B2 | 11/2015 | Bodwin et al. | |
| 9,218,849 B1* | 12/2015 | Trantham | G11B 27/36 |
| 9,223,693 B2* | 12/2015 | Sinclair | G06F 12/0246 |
| 9,336,133 B2* | 5/2016 | Sinclair | G06F 12/0246 |
| 9,344,596 B2* | 5/2016 | Ohishi | H04N 1/00973 |
| 9,348,746 B2* | 5/2016 | Sinclair | G06F 12/0246 |
| 9,465,731 B2* | 10/2016 | Sinclair | G06F 12/0246 |
| 9,652,382 B1* | 5/2017 | Subramanian | G06F 12/0253 |
| 9,734,050 B2* | 8/2017 | Sinclair | G06F 12/0253 |
| 9,734,911 B2* | 8/2017 | Sinclair | G06F 3/0658 |
| 9,778,855 B2* | 10/2017 | Sinclair | G06F 3/064 |
| 9,800,291 B1* | 10/2017 | Ben David | G06F 11/1415 |
| 9,817,752 B2 | 11/2017 | Desai et al. | |
| 9,824,007 B2 | 11/2017 | Desai et al. | |
| 10,108,543 B1* | 10/2018 | Duggal | G06F 11/14 |
| 10,108,544 B1* | 10/2018 | Duggal | G06F 11/14 |
| 10,120,613 B2* | 11/2018 | Sinclair | G06F 12/02 |
| 10,126,971 B1* | 11/2018 | Jain | G06F 3/0685 |
| 10,133,490 B2* | 11/2018 | Sinclair | G06F 3/0655 |
| 10,255,179 B2* | 4/2019 | Ji | G06F 3/0659 |
| 10,374,637 B1* | 8/2019 | Danilov | H03M 13/611 |
| 10,430,279 B1* | 10/2019 | Dittia | G06F 3/0656 |
| 10,739,996 B1* | 8/2020 | Ebsen | G06F 16/1727 |
| 10,795,812 B1* | 10/2020 | Duggal | G06F 3/067 |
| 10,936,542 B2 | 3/2021 | Kothari et al. | |
| 10,983,715 B2* | 4/2021 | Sharoni | G06F 21/79 |
| 11,086,537 B2* | 8/2021 | Byun | G06F 3/0604 |
| 2004/0117414 A1* | 6/2004 | Braun | G06F 8/65 |
| 2004/0254914 A1* | 12/2004 | Polizzi | G06F 9/45508 |
| 2005/0283579 A1 | 12/2005 | De Jong et al. | |
| 2006/0004756 A1 | 1/2006 | Peleg et al. | |
| 2006/0004957 A1* | 1/2006 | Hand, III | G06F 12/0866 |
| | | | 711/E12.019 |
| 2006/0005074 A1* | 1/2006 | Yanai | G06F 11/2066 |
| | | | 714/6.32 |
| 2007/0033325 A1* | 2/2007 | Sinclair | G06F 3/0608 |
| | | | 711/170 |
| 2008/0082596 A1* | 4/2008 | Gorobets | G06F 12/0253 |
| 2008/0115071 A1* | 5/2008 | Fair | G06F 11/1456 |
| | | | 715/764 |
| 2008/0140902 A1* | 6/2008 | Townsend | H04B 1/0475 |
| | | | 710/306 |
| 2008/0189477 A1* | 8/2008 | Asano | G06F 12/0246 |
| | | | 711/E12.008 |
| 2008/0307020 A1* | 12/2008 | Ko | G06F 21/6245 |
| 2009/0043831 A1* | 2/2009 | Antonopoulos | G06F 3/0614 |
| 2009/0276588 A1* | 11/2009 | Murase | G06F 3/0665 |
| | | | 711/E12.071 |
| 2010/0274951 A1* | 10/2010 | Fang | G06F 11/1666 |
| | | | 711/E12.001 |
| 2011/0145473 A1* | 6/2011 | Maheshwari | G11C 7/1072 |
| | | | 711/E12.008 |
| 2011/0161784 A1* | 6/2011 | Selinger | G06F 11/1016 |
| | | | 714/E11.002 |
| 2011/0236049 A1* | 9/2011 | Haga | G03G 15/5004 |
| | | | 399/75 |
| 2011/0302474 A1 | 12/2011 | Goss et al. | |
| 2012/0278529 A1 | 11/2012 | Hars et al. | |
| 2012/0304039 A1* | 11/2012 | Peterson | H03M 13/05 |
| | | | 711/E12.008 |
| 2013/0003462 A1* | 1/2013 | Castagna | G11C 16/30 |
| | | | 365/185.23 |
| 2013/0024423 A1* | 1/2013 | Doshi | G06F 11/1448 |
| | | | 707/640 |
| 2013/0173554 A1* | 7/2013 | Ubukata | G06F 11/2094 |
| | | | 707/640 |
| 2014/0006688 A1* | 1/2014 | Yu | G06F 12/0246 |
| | | | 365/185.03 |
| 2014/0325148 A1* | 10/2014 | Choi | G06F 3/0659 |
| | | | 711/114 |
| 2014/0365719 A1* | 12/2014 | Kuzmin | G06F 12/0246 |
| | | | 711/103 |
| 2015/0227602 A1* | 8/2015 | Ramu | G06F 11/1456 |
| | | | 707/634 |
| 2015/0309898 A1* | 10/2015 | Shi | G06F 11/1662 |
| | | | 714/6.23 |
| 2015/0347019 A1* | 12/2015 | Pawlowski | G06F 3/0619 |
| | | | 711/154 |
| 2016/0004464 A1* | 1/2016 | Shen | G06F 3/0659 |
| | | | 711/103 |
| 2016/0246713 A1* | 8/2016 | Choi | G06F 3/0608 |
| 2017/0075622 A1* | 3/2017 | Kwon | G06F 3/0613 |
| 2017/0123655 A1* | 5/2017 | Sinclair | G06F 3/061 |
| 2017/0123972 A1* | 5/2017 | Gopinath | G06F 3/0616 |
| 2017/0132082 A1* | 5/2017 | Resch | G06F 11/1076 |
| 2017/0242790 A1* | 8/2017 | O'Krafka | G06F 3/0652 |
| 2017/0317828 A1* | 11/2017 | Reinhold | H04L 63/083 |
| 2018/0121112 A1* | 5/2018 | Imazaki | G06F 3/0619 |
| 2018/0189175 A1* | 7/2018 | Ji | G06F 3/0679 |
| 2018/0367309 A1* | 12/2018 | Reinhold | H04L 9/0662 |
| 2018/0373722 A1* | 12/2018 | Ulasen | G06N 3/045 |
| 2019/0146679 A1* | 5/2019 | Doh | G06F 3/0659 |
| | | | 711/103 |
| 2019/0163621 A1* | 5/2019 | Doh | G06F 12/0246 |
| 2019/0198118 A1* | 6/2019 | Shim | G11C 16/16 |
| 2020/0089420 A1* | 3/2020 | Sharoni | G06F 21/79 |
| 2020/0192794 A1* | 6/2020 | Lee | G06F 12/0246 |
| 2020/0218653 A1* | 7/2020 | Ryu | G06F 12/0253 |
| 2020/0242592 A1* | 7/2020 | Scrivner | G06Q 20/3672 |
| 2020/0310686 A1* | 10/2020 | Truong | G06F 3/061 |
| 2021/0152532 A1* | 5/2021 | Reinhold | H04L 9/0643 |
| 2021/0303185 A1* | 9/2021 | Mishra | G06F 3/0659 |
| 2021/0334201 A1* | 10/2021 | Bennett | G06F 11/3037 |
| 2021/0342362 A1* | 11/2021 | Haravu | G06F 11/1464 |
| 2021/0349785 A1* | 11/2021 | Klus | G06F 11/1461 |
| 2021/0406216 A1* | 12/2021 | Komatsu | G06F 16/16 |
| 2022/0107814 A1* | 4/2022 | Parab | G06F 9/4418 |
| 2022/0164144 A1* | 5/2022 | Cho | G11C 11/5671 |
| 2022/0171713 A1 | 6/2022 | Malshe et al. | |
| 2022/0269422 A1* | 8/2022 | Lee | G06F 11/3034 |
| 2022/0283707 A1* | 9/2022 | Ayzenberg | G06F 11/1451 |
| 2022/0283902 A1* | 9/2022 | Malamut | G06F 11/1464 |
| 2022/0334730 A1* | 10/2022 | Srimal | G06F 3/064 |
| 2023/0045156 A1 | 2/2023 | Bordia et al. | |
| 2023/0060638 A1* | 3/2023 | Natanzon | G06F 11/1464 |
| 2023/0176780 A1* | 6/2023 | Venugopal | G06F 3/0619 |
| | | | 711/154 |

OTHER PUBLICATIONS

Stephen J. Bigelow, "3D NAND flash", Feb. 20, 2023, pp. 1-7, https://web.archive.org/web/20230220220633/https://www.techtarget.com/searchstorage/definition/3D-NAND-flash (Year: 2023).*

Jason Feist, "Multi Actuator Technology: A New Performance Breakthrough", May 16, 2018, pp. 1-6, https://web.archive.org/web/20180516125606/https://blog.seagate.com/craftsman-ship/multi-actuator-technology-a-new-performance-breakthrough/ (Year: 2018).*

Delkin Industrial, "SSD Components: Focus on NAND Flash Die", Sep. 19, 2020, https://web.archive.org/web/20200919225732/https://www.delkin.com/blog/ssd-components-focus-on-nand-flash-die/ (Year: 2020).*

* cited by examiner

DATA STORAGE DEVICE AND METHOD FOR HOST-ASSISTED EFFICIENT HANDLING OF MULTIPLE VERSIONS OF DATA

CROSS-REFERENCE TO RELATED APPLICATION

This application claims priority to U.S. provisional patent application No. 63/449,835, filed Mar. 3, 2023, which is hereby incorporated by reference.

BACKGROUND

There is sometimes a need to maintain various versions of data as the data is changed over time (e.g., maintaining a previous version and a current version of the data). There are many ways in which a host can maintain these various versions. For example, a host can store different versions of the data in different data storage devices.

DETAILED DESCRIPTION

Figure 1A:
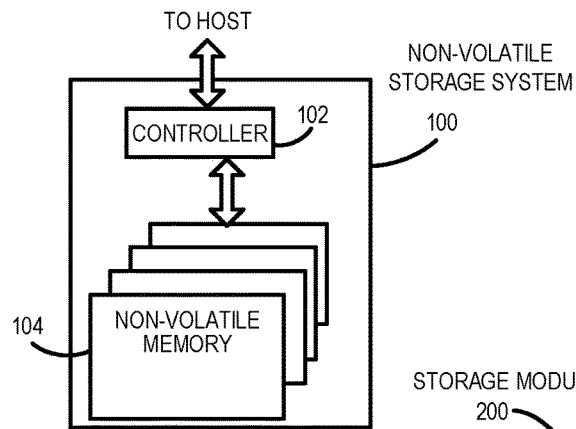
FIG. 1A is a block diagram of a data storage device of an embodiment.

The following embodiments generally relate to a data storage device and method for host-assisted efficient handling of multiple versions of data. In one embodiment, a data storage device is provided comprising a memory and a controller. The controller is configured to receive, from a host, identification of different versions of data that are to be deleted together; store the different versions of the data in areas of the memory that are erasable in parallel; receive, from the host, a command to erase the different versions of the data; and erase the different versions of the data in parallel.

In some embodiments, the areas of the memory that are erasable in parallel comprise a metablock.

In some embodiments, the memory comprises a plurality of memory dies; and the controller is further configured to: receive, from the host, identification of different versions of data that are to be read together; and store the different versions of the data that are to be read together in different memory dies of the plurality of memory dies so that the different versions of data that are to be read together are readable in parallel.

In some embodiments, the controller is further configured to: receive, from the host, a request that versions of data be moved to an area of the memory designed for cold data, wherein one of the versions of the data is hot data; and in response to the request, move the versions of the data to the area of the memory designed for cold data even though one of the versions of the data is hot data.

In some embodiments, the area of the memory designed for cold data comprises a slower access rate than an area of the memory designed for hot data.

In some embodiments, the request is generated in response to a number of versions of the data exceeding a threshold.

In some embodiments, the threshold varies from application to application on the host.

In some embodiments, the identification of the different versions of the data comprises logical block addresses of the different versions of the data.

In some embodiments, the different versions of the data comprise a base version of the data and a delta version of the data.

In some embodiments, the controller is further configured to maintain overprovisioning for the different versions of the data.

In some embodiments, the controller is further configured to receive, from the host, a command to upgrade or downgrade the versions of the data at run time using a segmented version data structure.

In some embodiments, the controller is further configured to receive, from the host, a command to revert to a previous version of the data.

In some embodiments, the memory comprises a three-dimensional memory.

In another embodiment, a method is provided that is performed in a data storage device comprising a memory. The method comprises: receiving, from a host, a request that versions of data be moved to an area of the memory designed for cold data, wherein one of the versions of the data is hot data; and in response to the request, moving the versions of the data to the area of the memory designed for cold data even though one of the versions of the data is hot data.

In some embodiments, the area of the memory designed for cold data comprises a higher bit error rate than an area of the memory designed for hot data.

In some embodiments, the area of the memory designed for cold data comprises a slower access rate than an area of the memory designed for hot data.

In some embodiments, the request is generated in response to a number of versions of the data exceeding a threshold.

In some embodiments, the threshold varies from application to application on the host.

In some embodiments, different versions of the data are moved to different memory dies of the memory.

In another embodiments, a data storage device is provided comprising a memory and at least one of: means for storing different versions of data in areas of the memory that are erasable in parallel; and means for moving different versions of data to an area of the memory that is designed for cold data even though one of the versions of the data is hot data.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
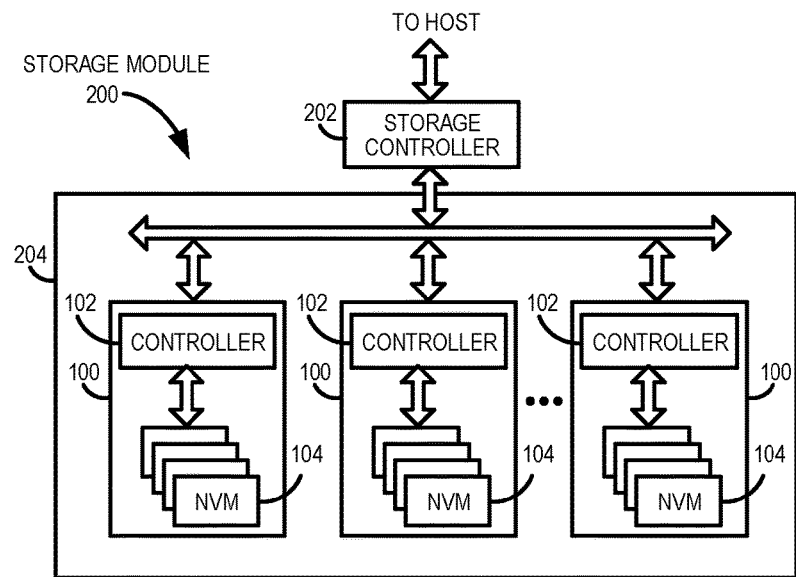
FIG. 1B is a block diagram illustrating a storage module of an embodiment.
Figure 1C:
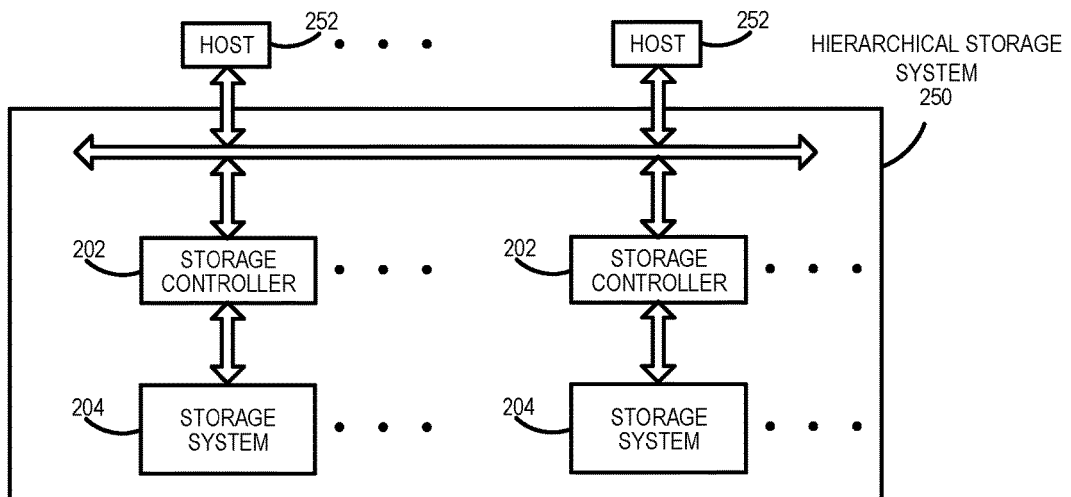
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
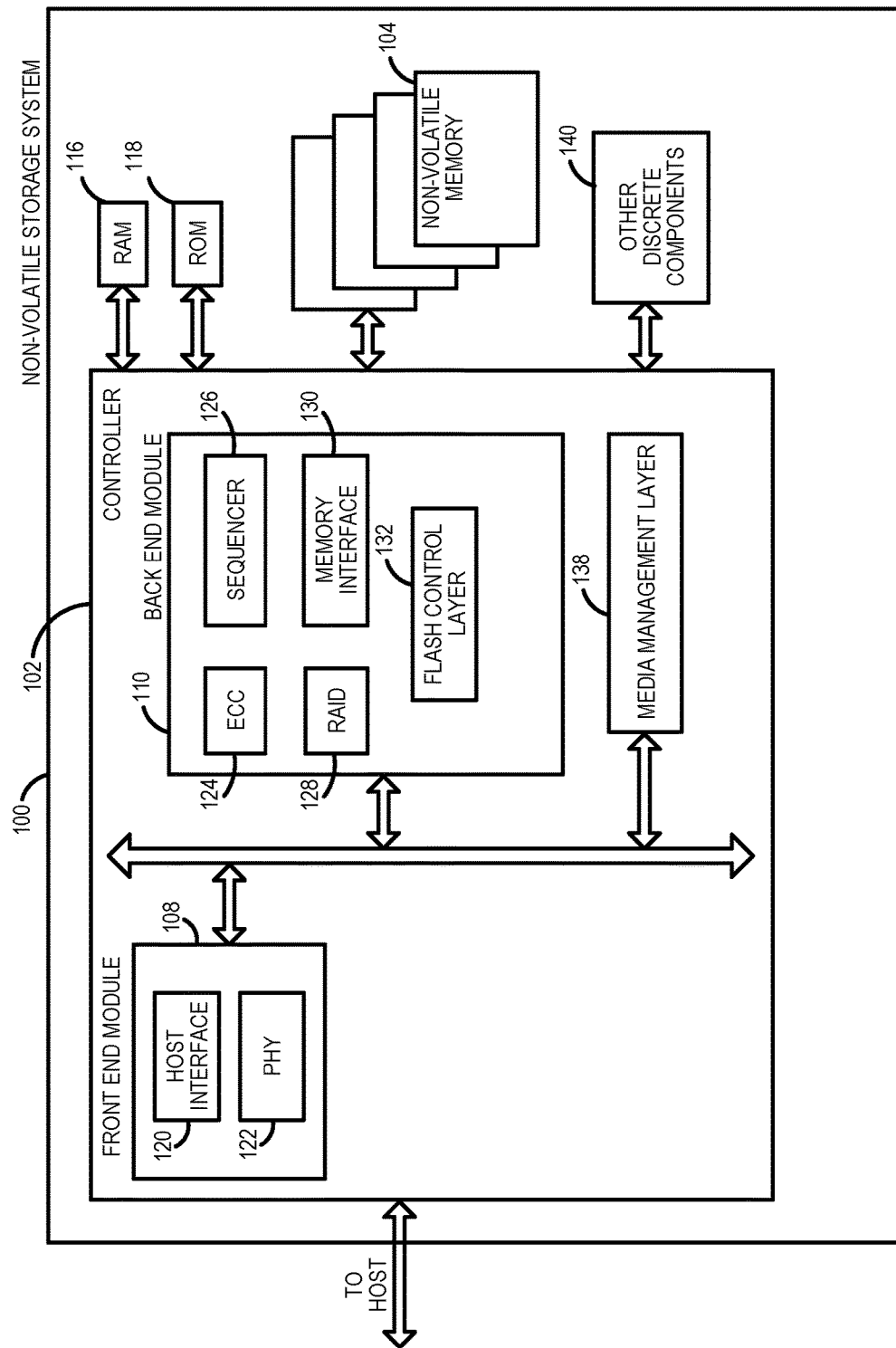
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
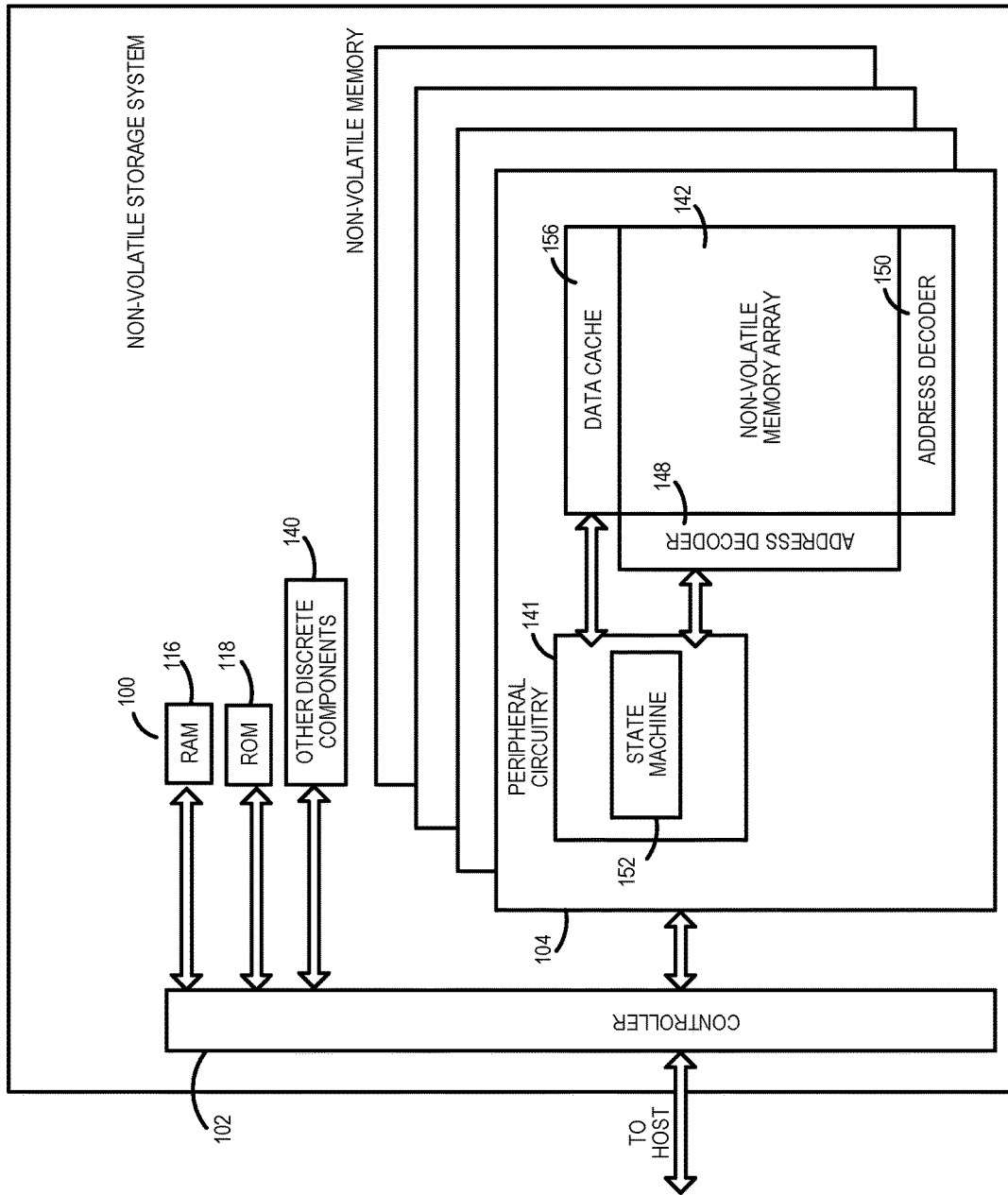
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
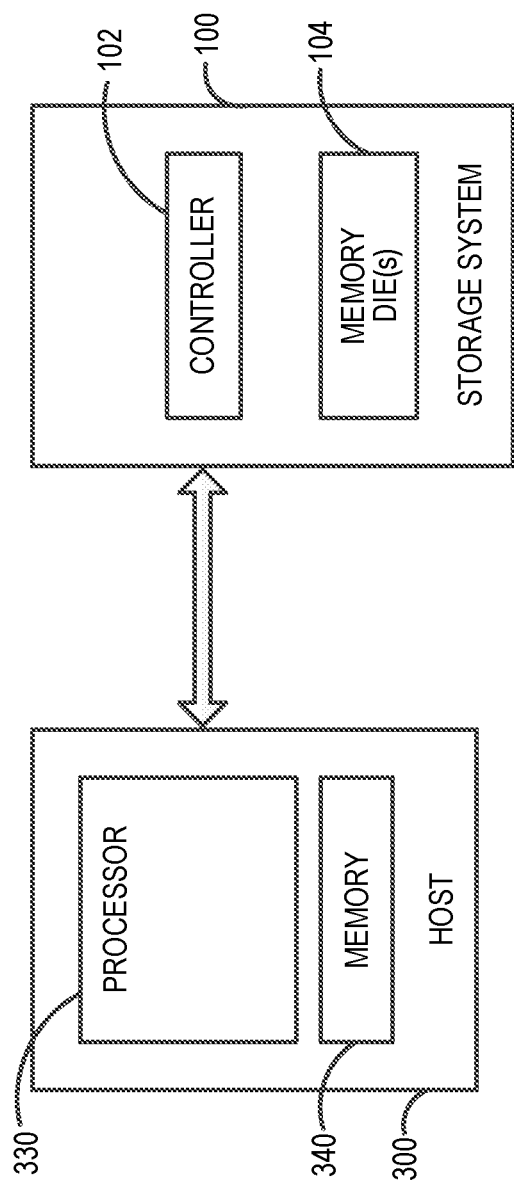
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, there is sometimes a need to maintain various versions of data as the data is changed over time (e.g., maintaining a previous version and current version of the data). There are many ways in which a host can maintain these various versions. For example, a host can store different versions of the data in different data storage devices or in different memories in the same data storage device. In this way, when the different versions of the data are needed, they can be accessed in parallel. However, such storage is not space or performance optimal.

Figure 4:
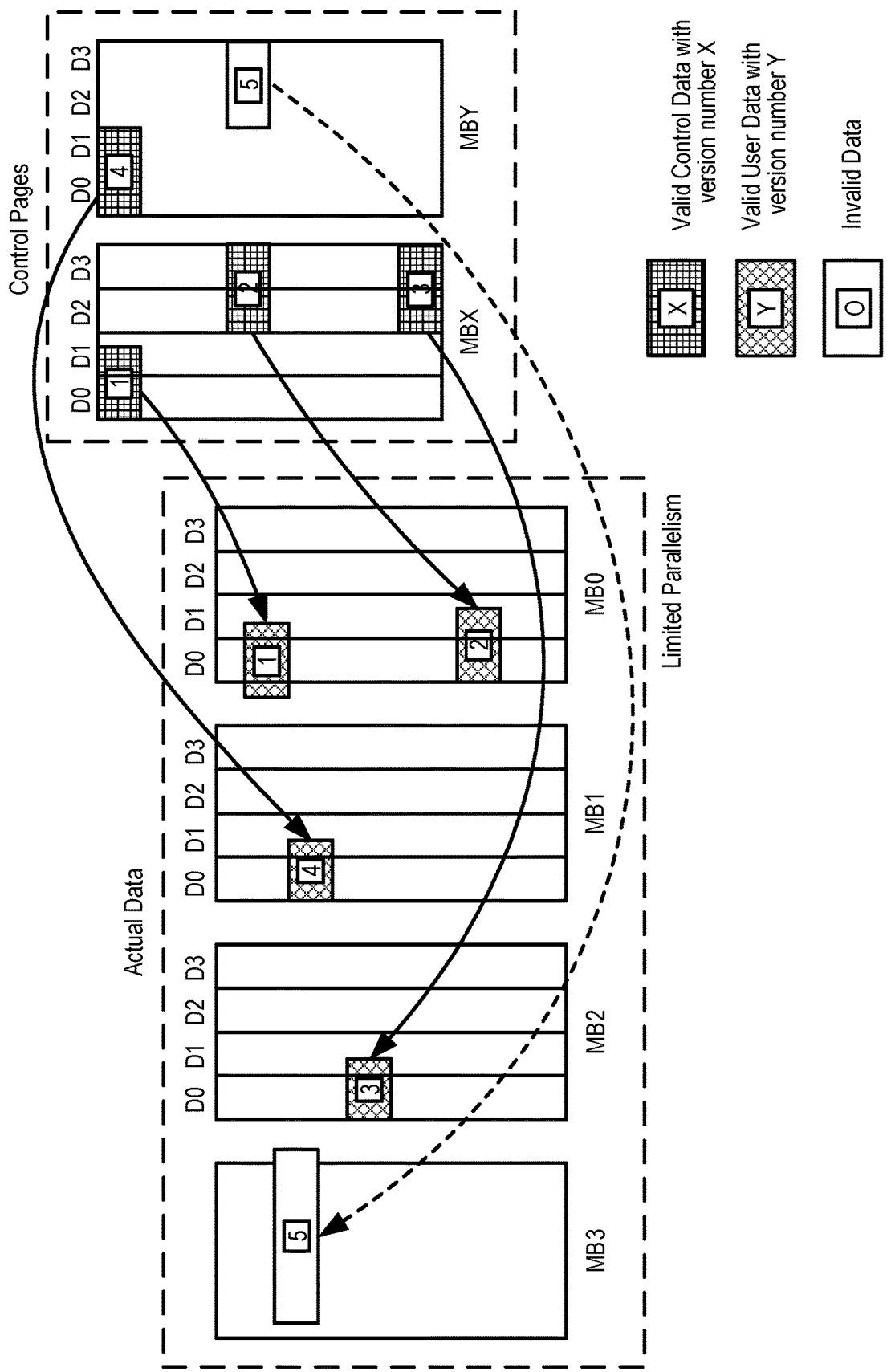
FIG. 4 is a diagram that illustrates storing multiple versions of data in a data storage device of an embodiment.

FIG. 4 shows multiple versions of data written over several metablocks (MB) of memory, where each metablock contains wordlines from multiple memory dies. The host may have written these multiple versions using the same logical block address (LBA) or different LBAs. But, here, the data storage device is not aware of versioning and did not take any specific actions in that regard. FIG. 4 also shows control pages containing logical-to-physical address translation map entries for the data. As can be seen in FIG. 4, the result is limited parallelism.

The following embodiments can be used to manage multiple versions more optimally for certain (e.g., critical) LBAs and utilize the data storage device 100 in a time- and space-efficient manner. In one embodiment, the different versions of the data are organized in such a manner that they can be accessed efficiently when invoked, and multiple versions are managed across blocks of memory 104 in a space-efficient manner. The controller 102 of the data storage device 100 can maintain this information internally when indicated by the host 300, and the host 300 can control how many versions for these LBAs are to be maintained and which versions will be accessed together or removed together.

These embodiments can involve the host 300 communicating to the data storage device 100 which LBAs are associated with the new version of previous LBAs, which versions will be accessed together, which versions can be removed simultaneously, and which versions are cold versions. The versions that will be accessed together can be stored in different dies for parallel access, and the versions that will be removed together can be stored in the same metablock (i.e., the same parallel erase unit) for less fragmentation of data. Further, a cold/invalid version can be moved to a higher bit error rate (BER)/cold partition with slow access.

Figure 5:
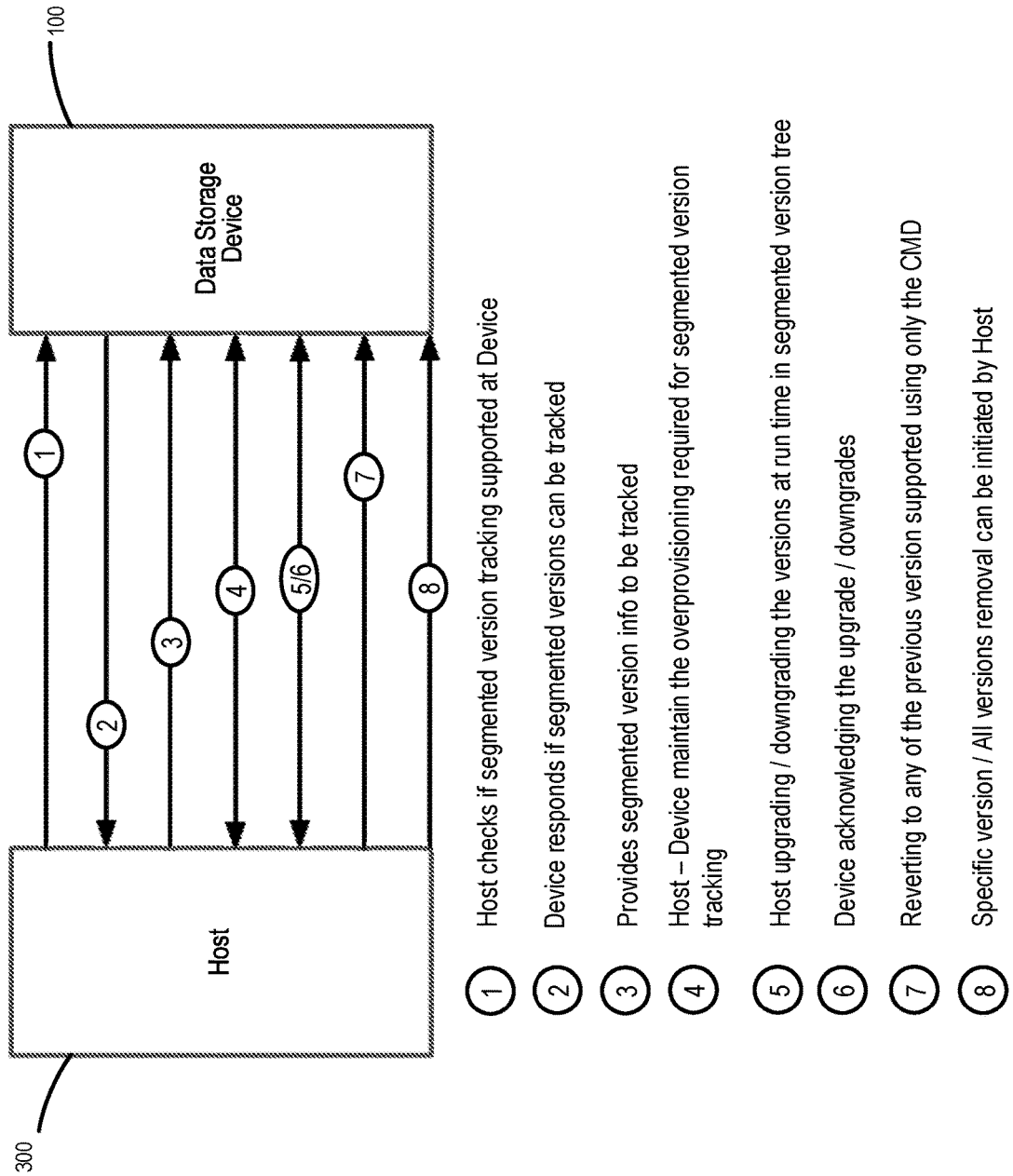
FIG. 5 is a diagram that illustrates host-data-storage-device communication used for version management of an embodiment.

In one embodiment, the host-data-storage-device communication used for version management (managed by specific commands) does not consume bus bandwidth in order to increase parallelism or to delete or revert to different versions. An example of such communication is shown in FIG. 5. As shown in FIG. 5, the host 300 first communicates with the data storage device 100 to check if segmented tracking is supported by the data storage device 100 (act 1), and the data storage device 100 responds if segmented tracking is supported (act 2). Then, the host 300 provides the segmented version information to be tracked to the data storage device 100 (act 3). This information can include, but is not limited to, which LBAs are associated with a new version of previous LBAs, which versions will be accessed together, which versions can be removed simultaneously, and/or which versions are cold versions. The host 300 and the data storage device 100 then maintain the overprovisioning required for segmented version tracking (act 4). The host 300 can upgrade or downgrade the versions at run time in a segmented version tree, as acknowledged by the data storage device 100 (acts 5 and 6). The host 300 can send a command to the data storage device 100 to revert to any of the previous versions (act 7), as well as to remove a specific version or all versions of the data (act 8).

Figure 6:
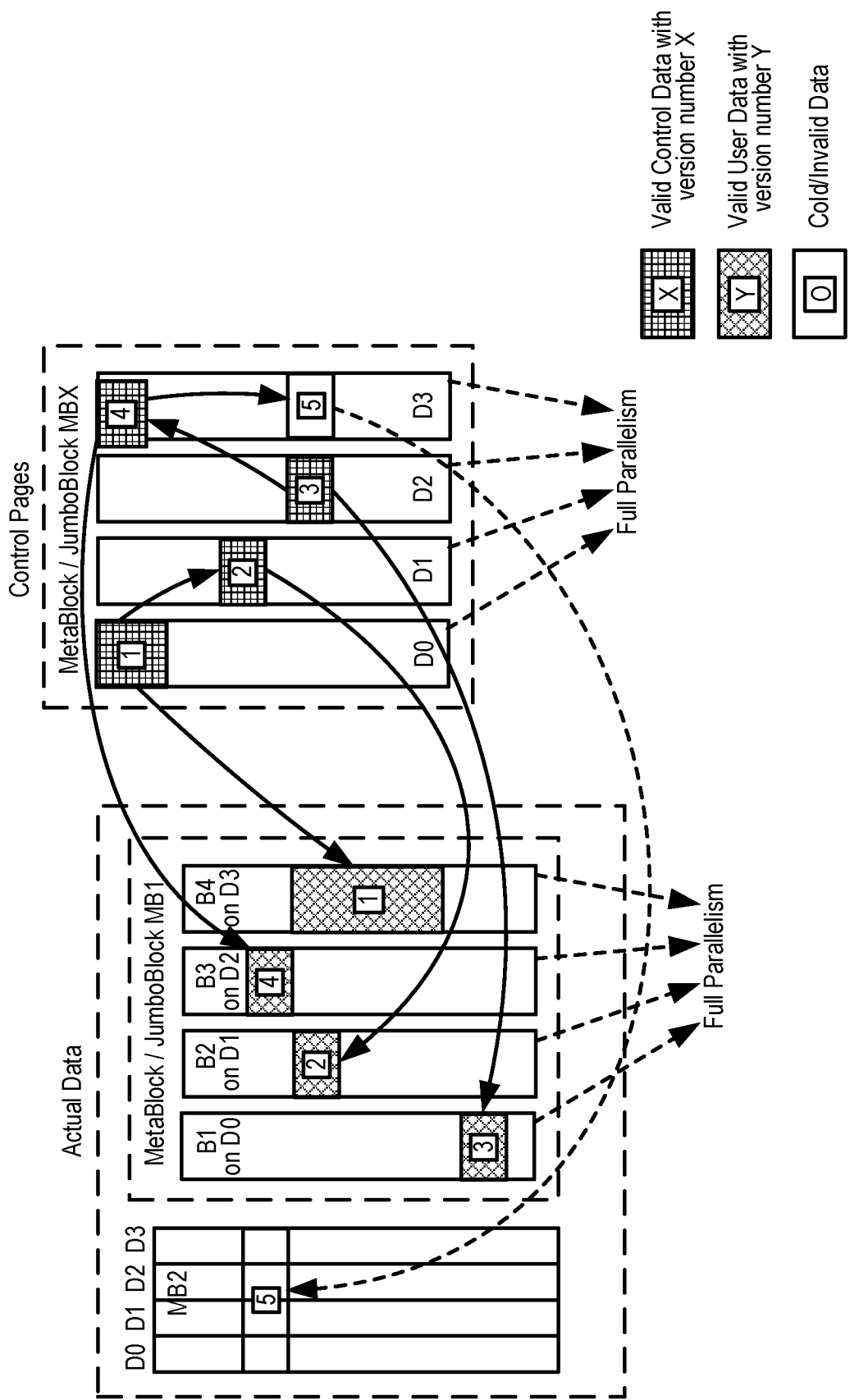
FIG. 6 is a diagram that illustrates parallel version accessing of an embodiment.

As mentioned above, these embodiments can be used for parallel version accessing. When multiple versions are maintained, the new version often contains a delta compared to a base version, and the base version and the delta can be accessed together. To avoid this being a total random allocation, these embodiments can be used, so that the host 300 can indicate which versions will be accessed together. The controller 102 of the data storage device 100 can then store those different versions in different memory dies, which allows the different versions to be accessed in parallel, thereby reducing the overall time to access the base and delta data of the multiple versions. This is illustrated in FIG. 6.

Also, these embodiments can result is less fragmentation by keeping versions of the data together. That is, after the host 300 indicates of which versions of the data will be removed together, the controller 102 of the data storage device 100 can store these versions in the same metablock (a unit of memory that will be erased together in parallel), thus causing less fragmentation in the memory 104 by limiting the spread to a smaller number of metablocks.

Figure 7:
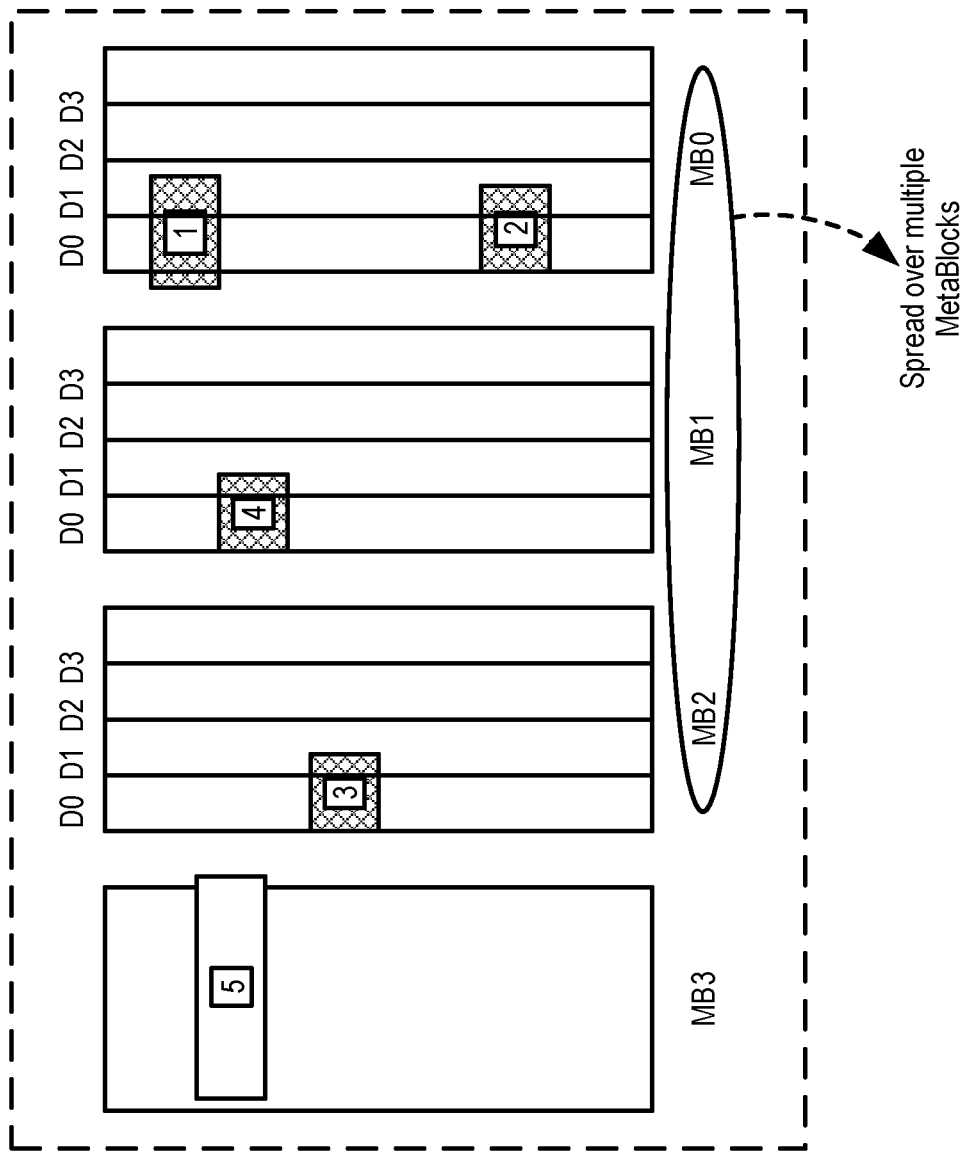
FIG. 7 is a diagram that illustrates the results of a storage technique where invalid versions of data are spread across a relatively-large number of metablocks.
Figure 8:
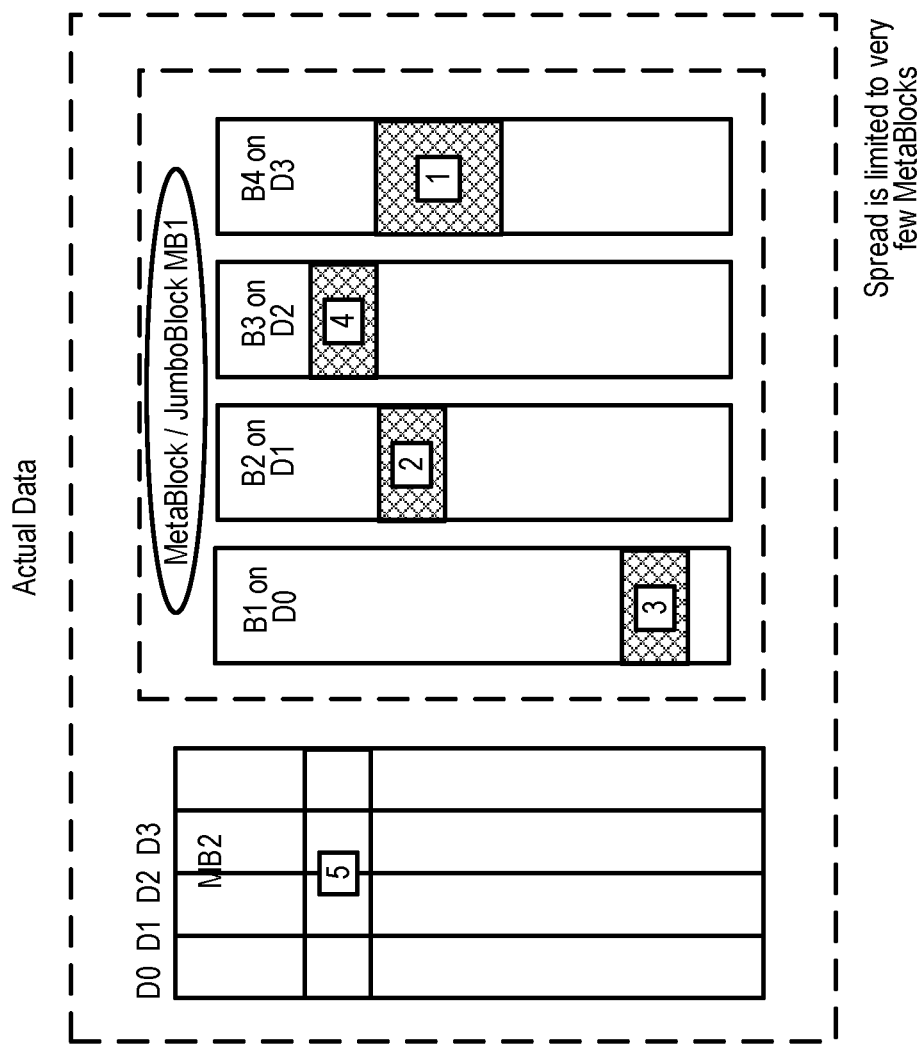
FIG. 8 is a diagram that illustrates the results of a storage technique of an embodiment where invalid versions of data are spread across a relatively-small number of metablocks.

FIGS. 7 and 8 illustrate these advantages by comparing the storing of different versions without using these embodiments (FIG. 7) and with using these embodiments (FIG. 8). As shown in FIG. 7, without using these embodiments, invalid versions of the data are spread across a larger number of metablocks. In contrast, as shown in FIG. 8, using these embodiments, the spread of the invalid versions of the data is controlled to a smaller number of metablocks, thus limiting fragmentation, which results in improved endurance.

Figure 10:
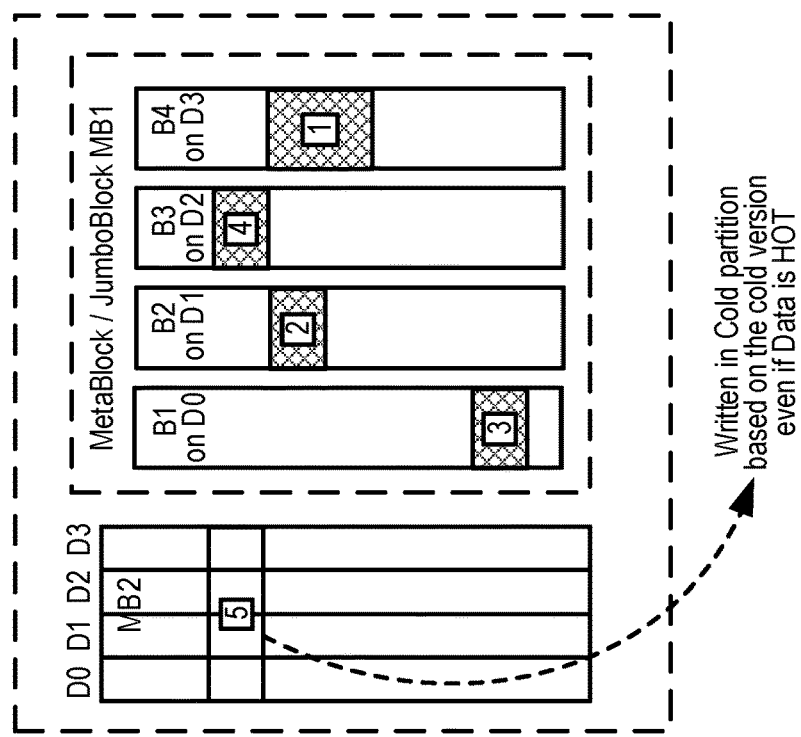
FIG. 10 is a diagram that illustrates how cold or invalid versions of data are maintained using an embodiment.
Figure 9:
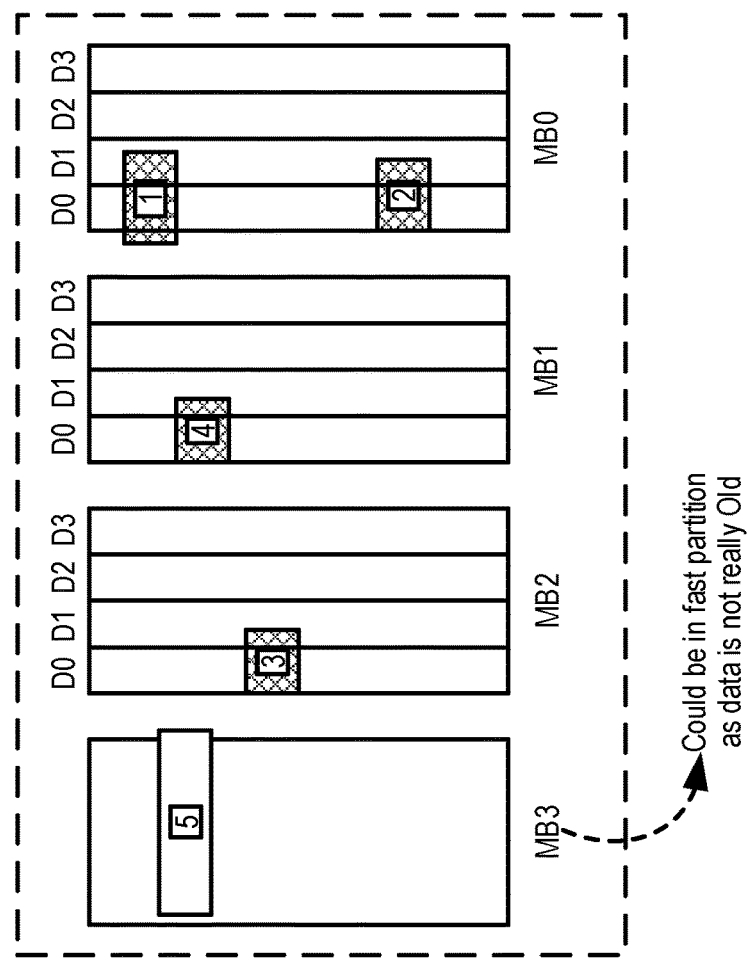
FIG. 9 is a diagram that illustrates how cold or invalid versions of data are maintained using a storage technique.

As also mentioned above, these embodiments can be used to maintain cold or invalid versions of data. In one embodiment, after a certain number of versions, the host 300 indicates a cold version that is to be stored in the coldest/deepest partition (e.g., having a high error rate, a slow access rate, etc.), thus freeing up space for more-important LBAs. Without this indication, the cold version, even it is not really cold in terms of total data written (e.g., a few megabytes old), could be stored in the fast partition, thus making the system inefficient. The cold version may vary from application to application on the host 300, thus making the amount of data variable. FIG. 9 is a diagram that illustrates how cold or invalid versions of data can be maintained without using theses embodiments, and FIG. 10 is a diagram that illustrates how cold or invalid versions of data can be maintained using theses embodiments.

There are several advantages associated with these embodiments. For example, these embodiments can provide optimal handling for version management which is space and time optimal. These embodiments can also provide parallel access to a base version and a newer delta version, thus making data access faster. Also, these embodiments can provide less fragmentation by limiting the spread of grouped versions that will be removed together, thus improving endurance. Further, these embodiments can allow a cold version to remain in the coldest partition even if the data is hot, thus freeing up space for more-important LBAs. Also, these embodiments can provide minimal movement of data on the bus and can be managed via commands making it time-optimal and fast.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory comprising a plurality of memory dies; and
a processor configured to communicate with the memory and further configured to:
  receive, from a host, identification of different versions of data that are to be erased together;
  store the different versions of the data in a metablock comprising wordlines from different memory dies of the plurality of memory dies, wherein the metablock is defined as a parallel erase unit of the memory such that all of the wordlines from the different memory dies of the plurality of memory dies are erasable together in parallel;
  receive, from the host, a command to erase the different versions of the data;
  erase the different versions of the data, wherein because the different versions of the data are stored in the parallel erase unit of the memory, the different versions of the data are erased in parallel;
  receive, from the host, a request that versions of data be moved to an area of the memory designed for cold data, wherein one of the versions of the data is hot data; and
  in response to the request, move the versions of the data to the area of the memory designed for cold data even though one of the versions of the data is hot data.

2. The data storage device of claim 1, wherein the processor is further configured to:
  receive, from the host, a request to read the different versions of data; and
  read the different versions of the data from the memory, wherein because the different versions of the data are stored in different memory dies of the plurality of memory dies, different versions of data are to be read in parallel.

3. The data storage device of claim 1, wherein the identification of the different versions of the data comprises logical block addresses of the different versions of the data.

4. The data storage device of claim 1, wherein the different versions of the data comprise a base version of the data and a delta version of the data.

5. The data storage device of claim 1, wherein the processor is further configured to maintain overprovisioning for the different versions of the data.

6. The data storage device of claim 1, wherein the processor is further configured to receive, from the host, a command to upgrade or downgrade the versions of the data at run time using a segmented version data structure.

7. The data storage device of claim 1, wherein the processor is further configured to receive, from the host, a command to revert to a previous version of the data.

8. The data storage device of claim 1, wherein the memory comprises a three-dimensional memory.

9. A data storage device comprising:
a memory; and
a processor configured to communicate with the memory and further configured to:
  receive, from a host, identification of different versions of data that are to deleted together;
  store the different versions of the data in areas of the memory that are erasable in parallel;
  receive, from the host, a command to erase the different versions of the data;
  erase the different versions of the data in parallel;
  receive, from the host, a request that versions of data be moved to an area of the memory designed for cold data, wherein one of the versions of the data is hot data; and
  in response to the request, move the versions of the data to the area of the memory designed for cold data even though one of the versions of the data is hot data.

10. The data storage device of claim 9, wherein the area of the memory designed for cold data comprises a slower access rate than an area of the memory designed for hot data.

11. The data storage device of claim 9, wherein the request is generated in response to a number of versions of the data exceeding a threshold.

12. The data storage device of claim 9, wherein the threshold varies from application to application on the host.

13. A method comprising:
performing in a data storage device comprising a memory:
  receiving, from a host, a request that versions of data be moved to an area of the memory designed for cold data, wherein one of the versions of the data is hot data; and
  in response to the request, moving the versions of the data to the area of the memory designed for cold data even though one of the versions of the data is hot data.

14. The method of claim 13, wherein the area of the memory designed for cold data comprises a higher bit error rate than an area of the memory designed for hot data.

15. The method of claim 13, wherein the area of the memory designed for cold data comprises a slower access rate than an area of the memory designed for hot data.

16. The method of claim 13, wherein the request is generated in response to a number of versions of the data exceeding a threshold.

17. The method of claim 13, wherein the threshold varies from application to application on the host.

18. The method of claim 13, wherein different versions of the data are moved to different memory dies of the memory.

19. A data storage device comprising:
a memory; and
means for:
  receiving, from a host, identification of different versions of data that are to deleted together;
  storing the different versions of the data in areas of the memory that are erasable in parallel;
  receiving, from the host, a command to erase the different versions of the data;
  erasing the different versions of the data in parallel;
  receiving, from the host, a request that versions of data be moved to an area of the memory designed for cold data, wherein one of the versions of the data is hot data; and
  in response to the request, moving the versions of the data to the area of the memory designed for cold data even though one of the versions of the data is hot data.

* * * * *